(12) United States Patent
Ferrari-Cicero et al.

(10) Patent No.: US 7,410,213 B1
(45) Date of Patent: Aug. 12, 2008

(54) ABSORBENT PAD FOR CHILD SAFETY SEAT

(76) Inventors: Brigitte Ferrari-Cicero, 2881 Meadowcrest Dr., Yorktown Heights, NY (US) 10598; Marlene Murphy, 105 Chelsea La., Wilmington, NC (US) 28409

( * ) Notice: Subject to any disclaimer, the term of this patent is extended or adjusted under 35 U.S.C. 154(b) by 0 days.

(21) Appl. No.: 11/462,605

(22) Filed: Aug. 4, 2006

Related U.S. Application Data

(60) Provisional application No. 60/705,754, filed on Aug. 5, 2005.

(51) Int. Cl.
 *A47C 31/11* (2006.01)
(52) U.S. Cl. .................................................. 297/219.12
(58) Field of Classification Search ............ 297/219.12, 297/256.17
 See application file for complete search history.

(56) References Cited

U.S. PATENT DOCUMENTS

| 4,883,701 | A | * | 11/1989 | Rankin et al. ........ 297/219.12 X |
| 4,885,200 | A | * | 12/1989 | Perdelwitz et al. .. 297/219.12 X |
| 4,891,454 | A | * | 1/1990 | Perdelwitz et al. .. 297/219.12 X |
| 4,892,769 | A | * | 1/1990 | Perdelwitz et al. .. 297/219.12 X |
| 5,662,380 | A | * | 9/1997 | Tam et al. ........... 297/219.12 X |
| 5,735,576 | A | * | 4/1998 | Pepys et al. ......... 297/219.12 X |
| 5,988,744 | A |   | 11/1999 | Franchak |
| 6,224,152 | B1 |   | 5/2001 | Hughes et al. |
| 6,394,543 | B1 |   | 5/2002 | Dunne et al. |
| 6,454,352 | B1 |   | 9/2002 | Konovalov et al. |
| 6,655,734 | B2 | * | 12/2003 | Hunter et al. ........ 297/219.12 X |
| 6,702,381 | B2 |   | 3/2004 | Endicott et al. |
| 6,752,457 | B2 |   | 6/2004 | Gold et al. |
| 6,860,555 | B2 | * | 3/2005 | Kassai et al. ............ 297/219.12 |
| 6,926,359 | B2 | * | 8/2005 | Runk ..................... 297/219.12 |
| 6,929,326 | B2 |   | 8/2005 | Cohen-Fyffe |
| 7,281,285 | B2 | * | 10/2007 | Zucker et al. ........ 297/219.12 X |
| 2001/0048235 | A1 | * | 12/2001 | Hartranft ............... 297/219.12 |
| 2004/0090097 | A1 |   | 5/2004 | Bugher |
| 2004/0145224 | A1 | * | 7/2004 | Kassai et al. ........... 297/219.12 |
| 2004/0207239 | A1 | * | 10/2004 | King ..................... 297/219.12 |
| 2004/0239163 | A1 |   | 12/2004 | Runk |
| 2004/0245819 | A1 |   | 12/2004 | Bugher |
| 2005/0110315 | A1 | * | 5/2005 | Littlehorn et al. ...... 297/219.12 |

* cited by examiner

*Primary Examiner*—Rodney B. White
(74) *Attorney, Agent, or Firm*—Elizabeth Herbst Schierman; Dykas, Shaver & Nipper, LLP

(57) ABSTRACT

A disposable child safety seat pad is formed of a liquid permeable outer layer, an absorbent core and a liquid impervious base layer. The pad is configured to cover the exposed child contact areas of a safety seat and is releasably secured to the seat by adhesive strips positioned on the base layer. Perforation lines are provided on a seat back portion of the pad and on a seat bottom portion of the pad. The perforations are opened to provide apertures for connecting safety harness webbing to safety seat anchor points.

17 Claims, 4 Drawing Sheets

ABSORBENT PAD FOR CHILD SAFETY SEAT

RELATED APPLICATIONS

This application claims the benefit of U.S. Provisional Application No. 60/705,754 filed Aug. 5, 2005 and incorporated herein by reference.

BACKGROUND OF THE INVENTION

1. Field of the Invention

The present invention relates generally to children's safety seats for vehicular use and more specifically to a disposable absorbent pad for covering same.

2. Antecedents of the Invention

The employment of restraints for children riding in vehicles has become mandatory throughout the United States. Among the types of restraints available were infant carrier/car seats, which have been designed for transporting infants from birth up to approximately one year of age. Infant carrier/car seats were required to be installed only in the rear seat of a vehicle and included a harness having shoulder straps which were engaged through the rear of the safety seat back and a chest clip for gathering and positing the shoulder straps. The harness additionally included lap straps and a center crotch buckle.

Further child restraints have been categorized as convertible car seats, which were employed in both rear facing and forward facing positions for children exceeding certain weights, but who were within the weight/height/age requirements for mandatory usage of child restraints.

A third category of child restraints were booster seats which elevated a child to a level for use of a conventional seat belt and shoulder restraint. Booster seats were available with a unitary seat and back as well as with a seat bottom only.

As used hereinafter, the term "safety seat" shall be interpreted as to include all of the foregoing child restraints.

Virtually all safety seats included cushions covering child contact surfaces, e.g. the back, bottom and inwardly facing contoured sides of the seat, so as to provide comfort and a harness having three or five point anchor contacts with the seat frame. Openings were formed in the seat cushions through which the harness webbing passed at each of the three or five contact points, as well as additional sets of openings for the seat back contact points to enable adjustment of the shoulder webbing portions of the harness.

Children were prone to soil the seat cushions either by spilling or dripping liquid or through diaper leakage. While some cushions included a liquid impervious outer layer, so that they may be wiped, such cushions were generally uncomfortable for children, since the cushion contact surface did not allow air or liquids to pass through. Further, since the spilled liquids were not absorbed in the cushion, they would tend to migrate beyond the cushion, wetting the child's clothing, as well as the safety seat frame and the vehicle upholstery.

Additionally, the removal of soiled cushions for washing proved to be a difficult and time consuming task. While the seat cover disclosed in U.S. Pat. No. 6,926,359, facilitated removal and installation, a soiled seat cover was not readily disposable, due to cost considerations.

There was a need for a disposable child seat pad which is simple to install and easy to remove after having been soiled.

SUMMARY OF THE INVENTION

A disposable child safety seat pad is formed of a durable yet liquid permeable porous outer layer, an absorbent core and a liquid impervious base layer having peripheral border portions overlaid with contact or pressure sensitive adhesive. The pad is configured to cover the exposed child contact areas of a safety seat, and overlie the sides, top, front and back portions of the safety seat, with the contact a pressure sensitive adhesive releasably securing the pad in position.

Perforation lines are provided in a seat back portion of the pad and in a seat bottom portion of the pad. Selected seat back perforations are opened to provide apertures through the seat back portion in areas registered with harness shoulder web anchor points and the seat bottom perforations are opened to provide apertures registered with the harness lap web anchor points.

From the foregoing compendium, it will appreciated that is an aspect of the present invention to provide a disposable child safety seat pad of the general character described which is not subject to the disadvantages of the antecedents of the invention aforementioned.

It is a feature of the present invention to provide a disposable child safety seat pad of the general character described which is simple to use.

A consideration of the present invention is to provide a disposable child safety seat pad of the general character described which is relatively low in cost.

Another aspect of the present invention is to provide a disposable child safety seat pad of the general character described which may be applied over an existing child safety seat cushion and prevents the cushion from becoming soiled.

Another feature of the present invention is to provide a disposable child safety seat pad of the general character described which is suitable for manufacture by economical mass production fabrication.

Another consideration of the present invention is to provide a disposable child safety seat pad of the general character described which assures a child's comfort during travel.

A still further aspect of the present invention is to provide a disposable child safety seat pad of the general character described which is well suited for usage by all children whose weight, height and/or age qualifies for mandatory safety seat usage.

A further consideration of the present invention is to provide a disposable child safety seat pad of the general character described which readily absorbs spilled liquids or diaper leakage.

Yet another feature of the present invention is to provide a disposable child safety seat of the general character described which is durable for extended usage and need be replaced only when soiled.

To provide a disposable child safety seat pad of the general character described which is both safe and efficacious is a still further consideration of the present invention.

Other aspects, features and considerations of the present invention in part will be obvious and in part will be pointed out hereinafter.

With these ends in view, the invention finds embodiment in the various combinations of elements, arrangements of parts and series of steps by which the said aspects, features and considerations aforementioned and certain other aspects, features and considerations are attained, all with reference to the following description and drawings and the scope of which will be more particularly pointed out and indicated in the appended claims.

BRIEF DESCRIPTION OF THE DRAWINGS

It should be noted that in the drawings, which are to be briefly described hereinafter, for clarity of illustration and understanding, elements of the figures have not necessarily been drawn to scale and certain elements have been omitted.

In the accompanying drawings in which are shown one of the various exemplary embodiments of the invention.

DESCRIPTION OF THE PREFERRED EMBODIMENT

Figure 1:
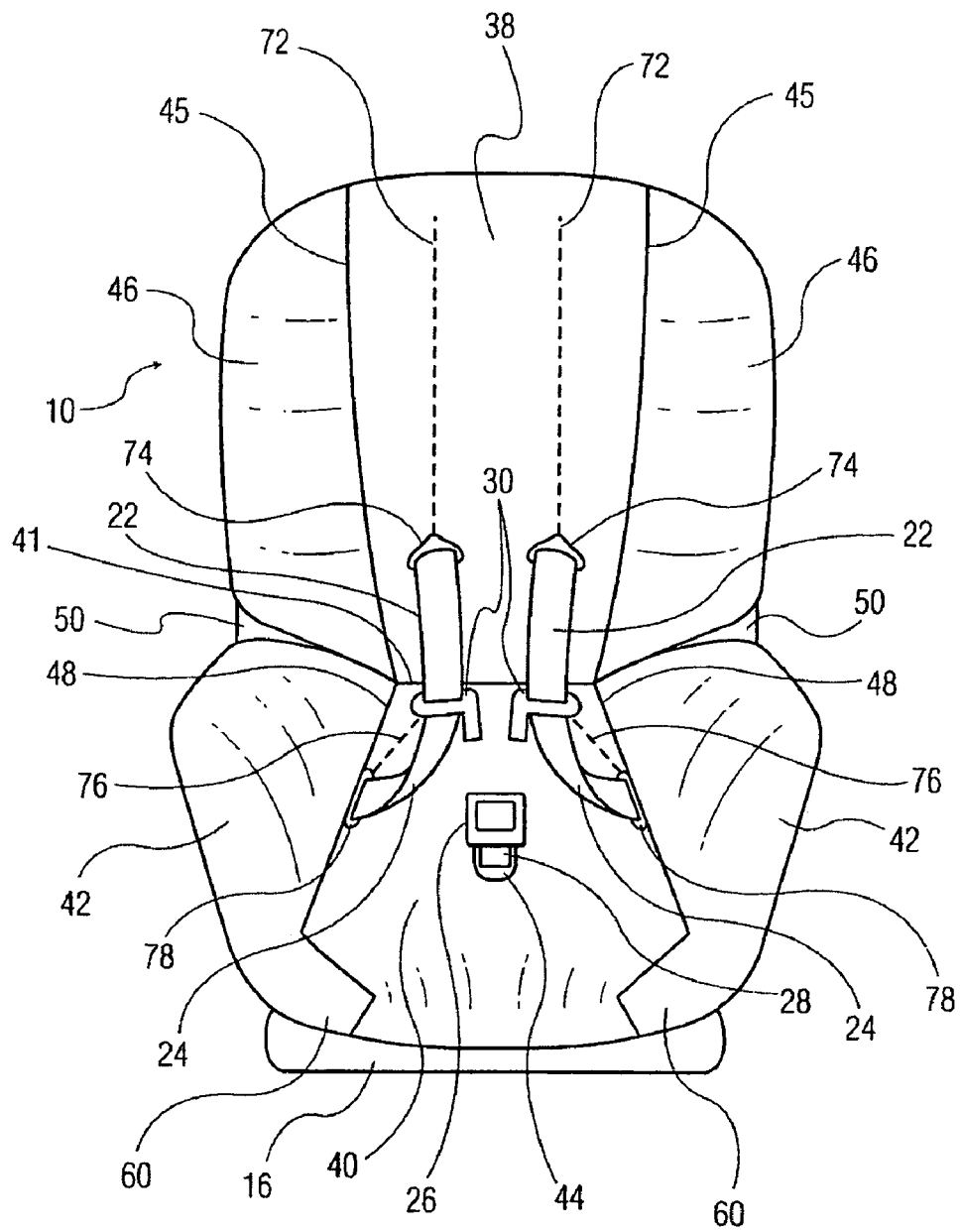
FIG. 1 is a front perspective view of a disposable absorbent pad constructed in accordance with and embodying the invention positioned on a child safety seat.

Referring now in detail to the drawings, the reference numeral 10 denotes generally a disposable absorbent child safety seat pad constructed in accordance with and embodying the invention. The pad 10 is configured to be applied over any of a variety of conventional child safety seats, i.e. for universal fit. A typical child safety seat 12 includes an outer shell 14, a seat cushion 18 and a harness 20, having shoulder webbing portions 22 as well as lap webbing portions 24.

The harness 20 additionally includes a buckle 26 joined to a buckle tether 28, which extends through the seat bottom. A pair of buckle clips 30 are engageable in the buckle 26 and serve to separate the shoulder webbing portion of the harness from the lap webbing portion. Also employed in conjunction with the harness 20 is a chest clip which is not illustrated.

The seat cushion 18 includes a seat back, which is provided with a plurality of pairs of spaced openings 32, 34 and 36. The shoulder webbing 22 extends through a selected pair of the openings 32, 34, 36 and is anchored through registered back openings in the child safety seat frame. Adjustment of the length of the shoulder webbing is achieved by selecting the appropriate sets of openings for anchoring the shoulder webbing.

Figure 2:
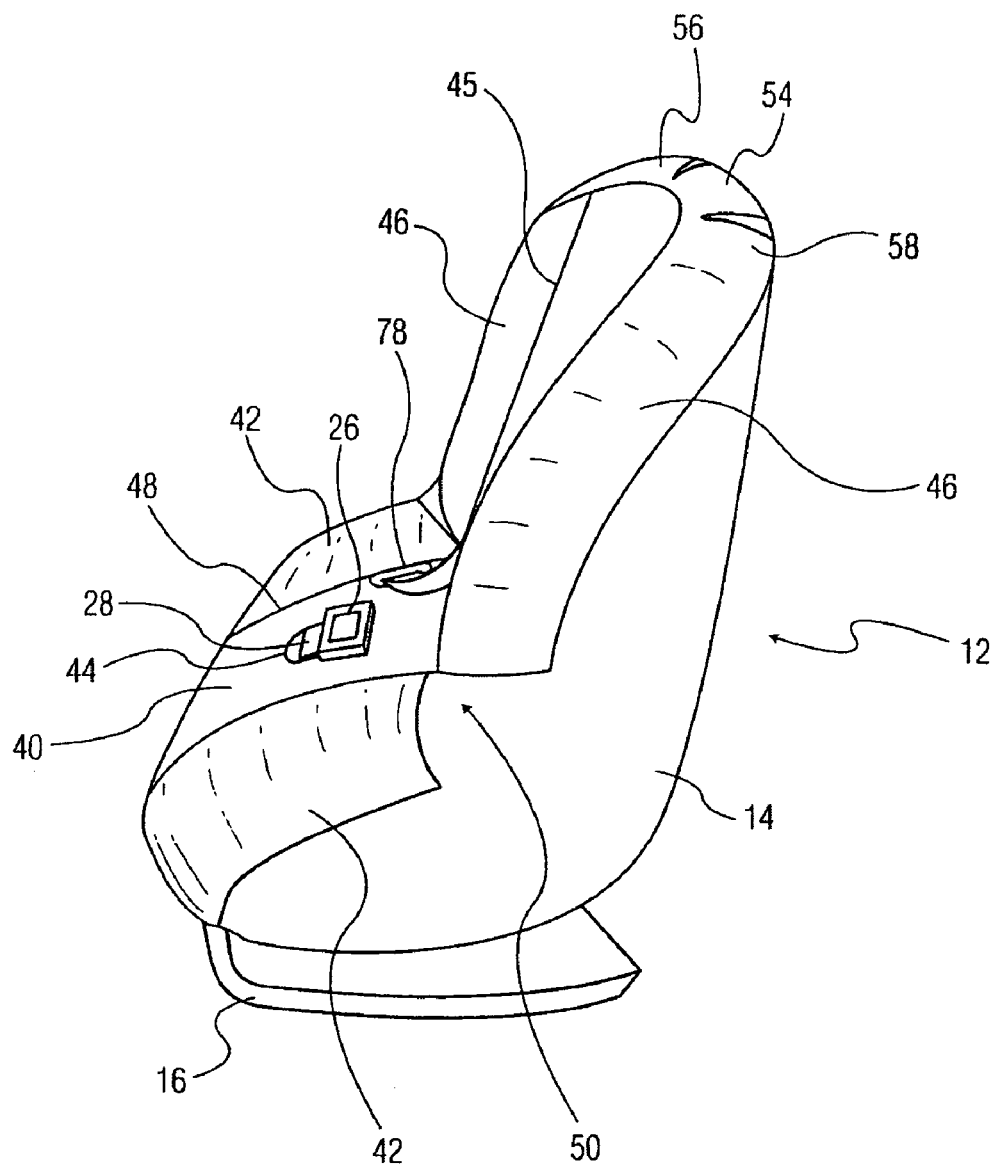
FIG. 2 is a side perspective side view of the child safety seat and the disposable pad pursuant to the present invention.
Figure 3:
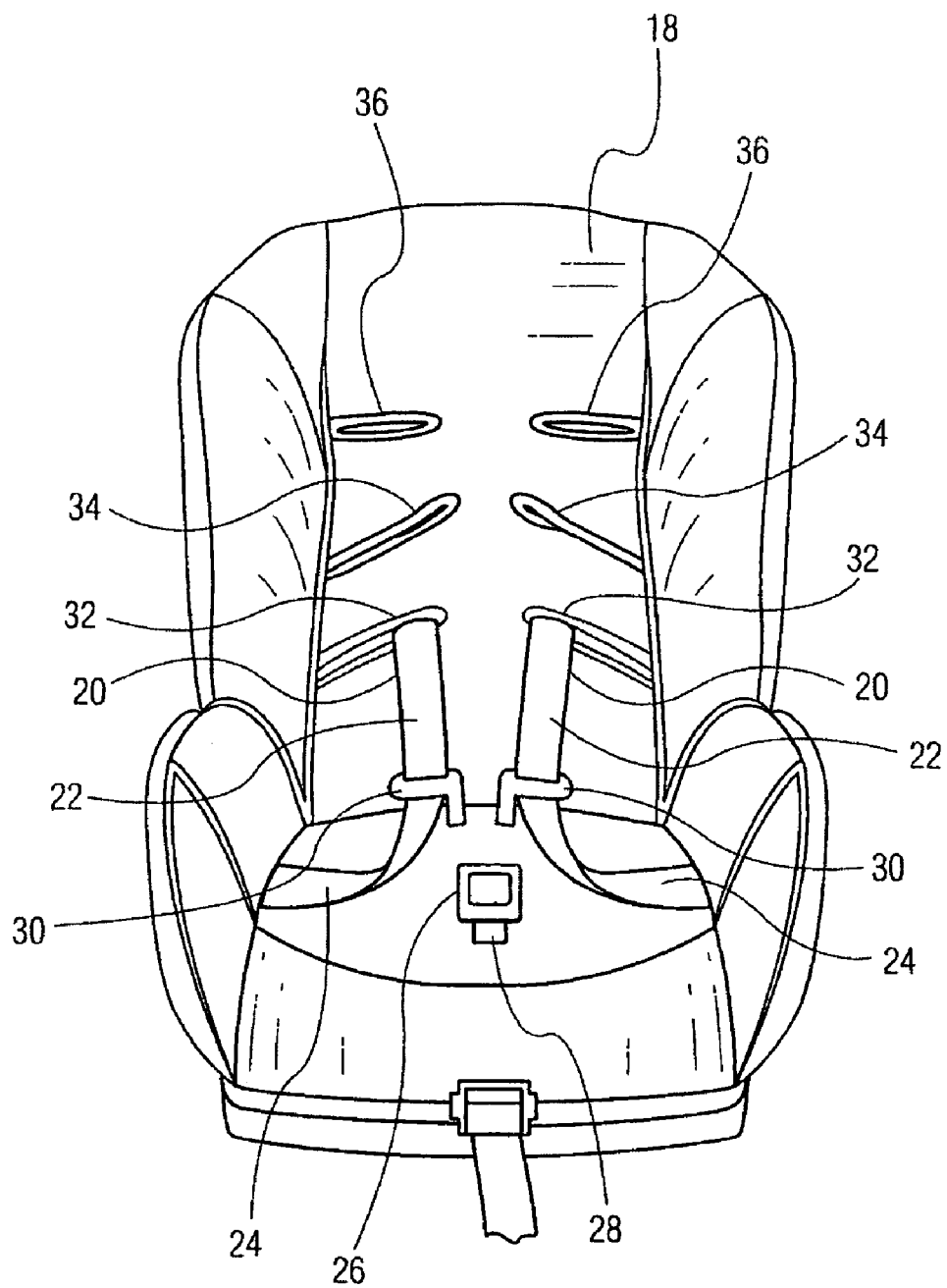
FIG. 3 is a side perspective view of a the child seat depicted in FIG. 1, prior to placement of the disposable pad and showing a conventional seat cushion.
Figure 5:
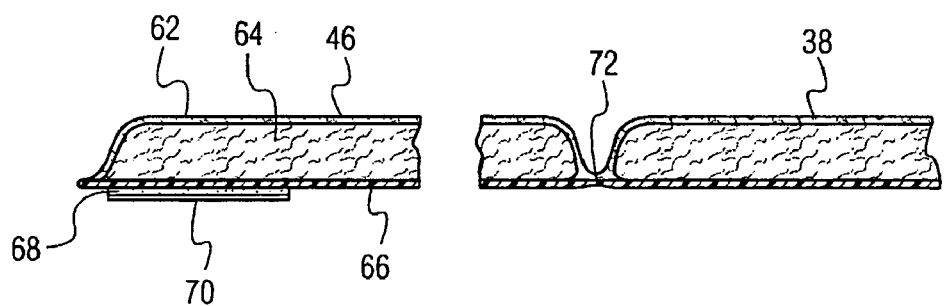
FIG. 5 is a greatly enlarged fragmentary sectional view through the disposable absorbent pad, the same being taken substantially along the line 5-5 in FIG. 5 and showing an absorbent core sandwiched between a durable porous liquid permeable outer layer and a liquid impervious base layer with peripheral portions of the liner overlaid with adhesive strips and also showing a separable perforation in the pad.

With attention now directed to FIGS. 1, 2 and 5, it should be noted that pursuant to the invention the disposable absorbent pad 10 includes a seat back portion 38 and a seat bottom portion 40. An optional seam or fold line 41 may define the boundary between the seat back portion 38 and the seat bottom portion 40. Projecting from the sides of the seat bottom portion 40 are outwardly extending lateral bolster flaps 42. A crotch area seat belt tether opening 44 is provided through the seat bottom portion 40.

The seat back portion 38 includes outwardly extending lateral side bolster flaps 46. An optional seam or fold line 45 may define the boundary between each flap 46 and the seat back portion 38. A "V" shaped cutaway notch 50 is provided between the bolster flaps 42, 46, so that the flaps will lie against the corresponding areas of the outer shell 14 without doubling over on themselves, as will be noted from an examination of FIG. 2.

Figure 4:
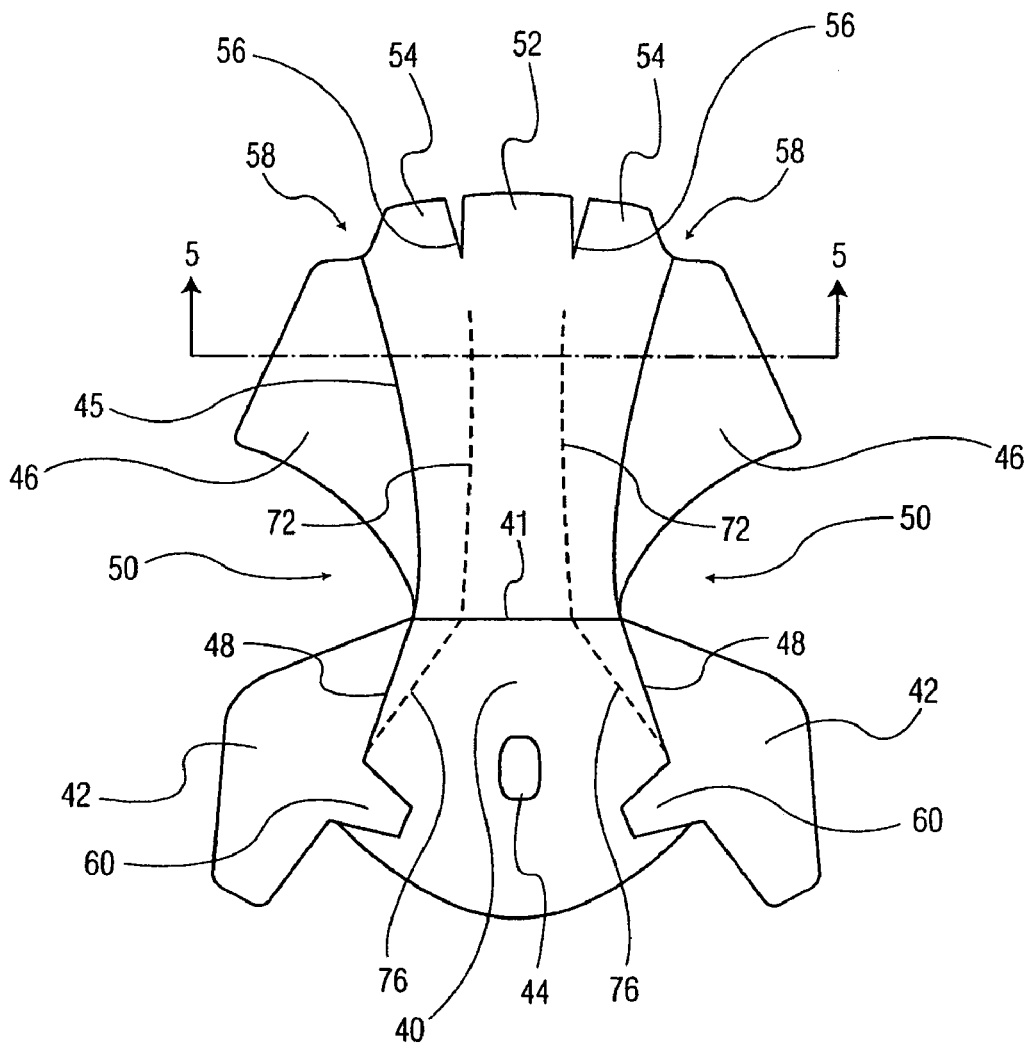
FIG. 4 is a plan view of the disposable absorbent pad of the present invention.

It should also be noted that the overall plan configuration of the disposable absorbent 10 pad, as illustrated in FIG. 4, when lying flat, is similar to an hour glass or that of a splayed fowl.

Projecting beyond the seat back portion 38 is a central seat top overwrap 52 and a pair of adjacent seat top overwraps 54, which are separated from the central overwrap 52 by a pair of "V" shaped cutaway notches 56, so that the overwraps 52, 54 will lie against the corresponding areas of the outer shell 14, adapting to the curved contour thereof, without doubling over on themselves, as can be observed in FIG. 2.

For the same purpose, there is provided a pair of corner cutouts 58, which separate the overwraps 54 from their adjacent respective bolster flaps 46, to permit the flaps and overwraps to conform to the contour of the outer shell 14.

An inwardly directed overwrap 60 extends from the approximate mid length of each bolster flap 42 and overlies a portion of the front of the seat bottom portion 40, as illustrated in FIG. 1. The overwraps 60 project beyond optional fold lines 48, which separate the seat bottom portion 40 from the bolster flaps 42.

As shown FIG. 5, the disposable absorbent pad 10, having a thickness in the order of 2 mm to 10 mm, is comprised of an outer durable, yet liquid permeable layer 62, an absorbent core 64 and a base layer 66 formed of flexible liquid impermeable thermoplastic film. The peripheral edges of the disposable absorbent pad 10, wherein the layer 62 joins the base layer 66, are suitably bonded.

The absorbent core may be comprised of any conventional absorbent fill material, for example, the absorbent materials disclosed in U.S. Pat. No. 7,071,423, U.S. Pat. No. 6,727,403, or an absorbent material comprising a gel such as that disclosed in U.S. Pat. No. 6,930,221, all of which are incorporated herein by reference. Further, the permeable layer 62 may comprise, by way of example only, a cover sheet such as that disclosed in U.S. Pat. No. 7,005,558, incorporated herein by reference.

There is provided on the base layer 66, adjacent the peripheral areas of the bolster flaps 42, 46, as well as the overwraps 52, 54 and 60, and/or any other areas of the base layer 66, a suitable fastener for releasbly securing the pad 10 to the child safety seat 12, such as a strip 68 of contact or pressure sensitive adhesive or a hook and loop tape fastener strip, with mating strips secured to the seat 12, or a snap or magnetic fastener. A release tape 70 may overlie strips 68 comprising a contact or pressure sensitive adhesive until such time as the disposable absorbent pad 10 is positioned for usage.

It should also be noted that a pair of substantially parallel lines of perforations 72 extend down the seat back portion 38. When installing the disposable absorbent pad 10, the perforations 72 are separated to provide apertures 74 registered with the pair of openings 32, 34 or 36 which are currently in use. The parallel lines of perforations 72 extend to the juncture of the seat back 38 and the seat bottom 40, from which point a pair of divergent lines of perforations 76 extended forwardly across the seat bottom portion 40. The perforations 76 are separated to provide apertures 78 through which the lap webbings 24 extend.

Further, for quick removal of a pad 10 which has been soaked with liquid, one need only pull apart, i.e. separate, the lines of perforations 72, 76 in their entirety, without disconnecting the harness attachments.

If desired, one may attach the pad 10 to the seat 12 by opening the entire lines of perforation 72, 76 and passing the harness webbing through to the liquid permeable layer side of the pad, without forming the specific apertures 74, 78 for the webbing anchor points.

Further, for quick removal of a pad 10 which has been soaked with liquid, one need only pull apart, i.e. separate, the lines of perforations 72, 76 in their entirety, without disconnecting the harness to safety seat connections. If desired, one may position a fresh pad 10 by opening the entire lines of perforation 72, 76 to form a single continuous slit and pulling the harness webbing through the slit, without forming specific openings and threading the webbing through such openings.

It should also be appreciated that the pad 10 may be configured with a seat bottom portion 40 and associated bolsters 42, omitting the seat back portion 38. In such instance, the line 41 comprises the peripheral edge of the pad 10.

Thus it will be seen that there is provided a disposable absorbent pad for a child safety seat which achieves the various aspects, features and considerations of the present invention and which is well adapted to meet the conditions of practical usage.

Since various possible embodiments might be made of the present invention and since various changes might be made in the exemplary embodiment set forth herein without departing from the spirit of the invention, it is to be understood that all matter herein described or shown in the accompanying drawings is to be interpreted as illustrative and not in the limiting sense.

Having thus described the invention, there is claimed as new and desired to be secured by Letters Patent:

1. A disposable absorbent pad for a child safety seat, the pad being dimensioned to overlie the bottom and back of the child safety seat, the pad comprising a liquid permeable outer layer, a core of liquid absorbent material and a base layer of liquid impermeable material, the pad having a seat bottom portion adapted to overlie the bottom of the child safety seat, a seat back portion adapted to overlie the back of the child safety seat and a fastener for releasably securing the disposable absorbent pad to the child safety seat, the pad also comprising back perforations extending through the seat back portion of the pad and bottom perforations extending through the seat bottom portion of the pad, the pad being constructed so that at least one back perforation connects to at least one bottom perforation, the bottom and back perforations being configured to be selectively separable so as to form a plurality of apertures through the back or bottom portion of the pad or to form at least one aperture through both the back and bottom portions of the pad, each aperture allowing for safety harness webbing to pass therethrough.

2. A disposable absorbent pad for a child safety seat as constructed in accordance with claim 1 further including bolster flaps extending from the seat bottom portion, the bolster flaps being dimensioned to overlie side portions of the child safety seat, the fastener being positioned on the base layer adjacent the periphery of each bolster flap.

3. A disposable absorbent pad for a child safety seat as constructed in accordance with claim 2 further including seat back bolster flaps extending from the seat back portion, the seat back bolster flaps being dimensioned to overlie side portions of the seat back and a fastener positioned on the base layer adjacent the periphery of each seat back bolster flap.

4. A disposable absorbent pad for a child safety seat as constructed in accordance with claim 3, the seat back bolster flaps being separated from the seat bottom bolster flaps by a V-shaped notch.

5. A disposable absorbent pad for a child safety seat as constructed in accordance with claim 1 further including seat back bolster flaps extending from the seat back portion, the seat back bolster flaps being dimensioned to overlie side portions of the seat back, the fastener being positioned on the base layer adjacent the periphery of each seat back bolster flap.

6. A disposable absorbent pad for a child safety seat as constructed in accordance with claim 1 wherein the back perforations extend along a pair of parallel lines, whereby the back perforations may be separated to provide apertures registered with selected safety seat harness anchor points.

7. A disposable absorbent pad for a child safety seat as constructed in accordance with claim 1 further including a plurality of overwraps extending from the seat back portion, the overlaps being separated from one another by a V-shaped notch, and a fastener positioned on the base layer adjacent the periphery of each overwrap.

8. A disposable absorbent pad for a child safety seat as constructed in accordance with claim 1 further including a child safety seat, the pad being positioned on the safety seat and being releasably secured thereto by the fastener.

9. A disposable absorbent pad for a child safety seat as constructed in accordance with claim 8 further including bolster flaps extending from the seat bottom portion, the bolster flaps overlying side portions of the child safety seat, the fastener being positioned on the base layer adjacent the periphery of the bolster flaps.

10. A disposable absorbent pad for a child safety seat as constructed in accordance with claim 1 wherein the pad has a thickness in the order of 2 mm to 10 mm.

11. A disposable absorbent pad for a child safety seat, the pad being dimensioned to overlie the bottom and back of the child safety seat, the pad comprising a liquid permeable outer layer, a core of liquid absorbent material and a base layer of liquid impermeable material, the pad having a seat bottom portion adapted to overlie the bottom of the child safety seat, a seat back portion adapted to overlie the back of the child safety seat and a fastener for releasably securing the pad to the child safety seat, the pad further including a pair of parallel lines of back perforations extending through the seat back portion and bottom perforations extending through the seat bottom portion, the pad being constructed so that each of the pair of parallel lines of back perforations connects to at least one bottom perforation, the bottom and back perforations being configured to be selectively separable so as to form a plurality of apertures through either the seat back portion or the seat bottom portion or to form at least one aperture through both the seat back portion and the seat bottom portion, each aperture allowing for safety harness webbing to pass therethrough.

12. A disposable absorbent pad for a child safety seat as constructed in accordance with claim 11 wherein the fastener comprises an adhesive strip positioned on the base layer.

13. A disposable absorbent pad for a child safety seat as constructed in accordance with claim 11 wherein the bottom perforations extending through the seat bottom are formed in a pair of divergent lines.

14. A disposable absorbent pad for a child safety seat as constructed in accordance with claim 13 wherein each of the parallel lines interconnects with one of the divergent lines.

15. A disposable absorbent pad for a child safety seat as constructed in accordance with claim 11 further including a child safety seat having a seat bottom, a seat back and safety harness webbing, the pad being releasably secured over the safety seat with the safety seat harness webbing extending through a pair or apertures formed by separated back perforations in the seat back portion of the pad and a pair or apertures formed by separated bottom perforations in the seat bottom portion of the pad.

16. A method of containing liquid spills or diaper leakage on a child safety seat having a bottom and a back, the method comprising the steps of:
   a) providing a disposable absorbent pad comprising a liquid permeable outer layer, a core of liquid absorbent material and a base layer of liquid impermeable material, the pad having a seat bottom portion adapted to overlie the bottom of the child safety seat and a seat back portion adapted to overlie the back of the child safety seat, the pad also comprising back perforations extending through the seat back portion of the bad and bottom perforations extending through the seat bottom portion of the pad, the pad being constructed so that at least one back perforation connects to at least one bottom perforation, b) placing the pad over the bottom and the back of the child safety seat, c) separating at least one of the bottom perforations and at least one of the back perforations to form at least one aperture through both the back and bottom portions of the pad, d) passing safety harness webbing through the at least one aperture, and e) releasably fastening the pad to the child safety seat.

17. A disposable absorbent pad for a child safety seat, the safety seat having a bottom, a back, and a safety harness, the pad having a bottom portion dimensioned to overlie the bottom of the child safety seat, the pad also having a back portion dimensioned to overlie the back of the child safety seat, the pad comprising a liquid permeable outer layer, a core of liquid absorbent material, a base layer of liquid impermeable material and a fastener for releasably securing the pad to the child safety seat, the pad further including back perforations extending through the back portion of the pad and bottom perforations extending through the bottom portion of the pad, the pad being constructed so that at least one back perforation connects to at least one bottom perforation, the bottom and back perforations being configured to be selectively separable so as to form three apertures through the pad for passage of the safety harness including at least one aperture through both the bottom and back portions of the pad, each aperture allowing for safety harness webbing to pass therethrough.

* * * * *